H. S. COHU.
Velocipede.
No. 89,128.
Patented April 20, 1869.
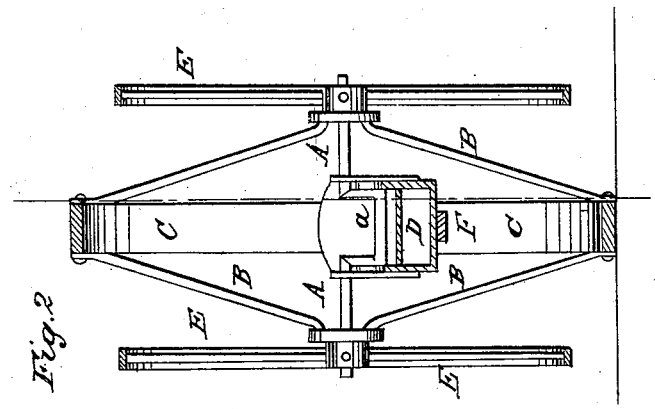
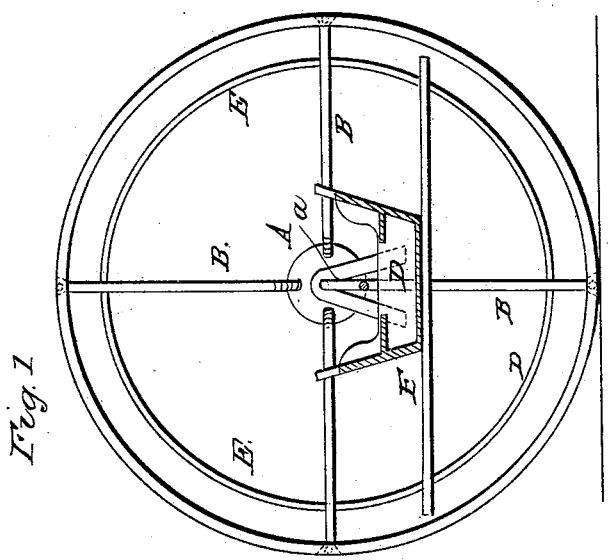
Witnesses
E. Greene Collins
Alex. J. Roberts
Inventor
H. S. Cohu.
per Munn & Co
attys

HENRY S. COHU, OF NEW YORK, N. Y.

Letters Patent No. 89,128, dated April 20, 1869.

IMPROVEMENT IN VELOCIPEDES.

The Schedule referred to in these Letters Patent and making part of the same.

*To all whom it may concern:*

Be it known that I, HENRY S. COHU, of the city, county, and State of New York, have invented a new and improved One-Wheeled Velocipede; and I do hereby declare that the following is a full, clear, and exact description thereof, which will enable others skilled in the art to make and use the same, reference being had to the accompanying drawings, forming part of this specification, in which—

Figure 1 represents a sectional side elevation of my improved one-wheeled velocipede.

Figure 2 is a vertical transverse section of the same.

Similar letters of reference indicate corresponding parts.

This invention relates to a new one-wheeled velocipede, which is arranged with spokes diverging laterally from the tire, so that sufficient space is formed within the wheel, and between the spokes, for arranging the driver's support or seat on the axle, and for operating the vehicle by applying power to the said axle in suitable manner.

Another feature of the invention is the application of two fly-wheels to the sides of the main wheel, said wheels being but little smaller than the main wheel, so that they will support the device when coming to a state of rest, and prevent its falling to either side. They also aid in propelling the velocipede, by gathering and equalizing the power.

A, in the drawing, represents the axle of my improved velocipede.

To the same are secured, at a suitable distance apart, two sets of spokes, B, which converge toward the rim C, and which are firmly fastened, both to the axle and to the rim.

From the axle is suspended, or on it is arranged, a seat or driver's support, D, which is fitted loose to the axle, to allow the same to turn without swinging the seat around with it.

Power is applied to a crank or cranks, a, of the axle, or to toothed or ratchet-wheels thereon, or otherwise to the said axle, by the hands or feet of the operator, or otherwise, either directly, or by the application of suitable intermediate mechanism.

To the axle are, or may be, outside of the aforesaid main wheel, firmly attached two wheels, E E, one on each side of the main wheel, and somewhat smaller than the same.

These wheels act as fly-wheels, to aid in the propulsion of the vehicle, and serve also to prevent the same from falling, and to support it when left at rest.

These wheels E may be arranged on one-wheeled velocipedes of suitable construction, whether the same be as above described, or otherwise.

A pole or bar, F, may be attached to the under side of the seat, to reach with its ends nearly to the rim of the wheel, as shown. It will act as a balance-pole, to prevent the short, swinging motion that would otherwise make the seat inconvenient.

Having thus described my invention,

What I claim as new, and desire to secure by Letters Patent, is—

In combination with a one-wheeled velocipede, the balance-wheels E E, crank a, and pendent seat D, all constructed and operating substantially as herein shown and described.

HENRY S. COHU.

Witnesses:
FRANK BLOCKLEY,
ALEX. F. ROBERTS.